May 29, 1962 E. O. BLODGETT 3,037,075

CODED INFORMATION TRANSLATION SYSTEM

Filed April 14, 1958 5 Sheets-Sheet 1

INVENTOR.
EDWIN O. BLODGETT
BY John A. Harvey
ATTORNEY

INVENTOR.
EDWIN O. BLODGETT
BY John A. Harvey
ATTORNEY

May 29, 1962 E. O. BLODGETT 3,037,075
CODED INFORMATION TRANSLATION SYSTEM
Filed April 14, 1958 5 Sheets-Sheet 3

INVENTOR.
EDWIN O. BLODGETT
BY John A. Harvey
ATTORNEY

May 29, 1962

E. O. BLODGETT 3,037,075

CODED INFORMATION TRANSLATION SYSTEM

Filed April 14, 1958

5 Sheets-Sheet 4

INVENTOR.
EDWIN O. BLODGETT
BY John A. Harvey
ATTORNEY

CODED INFORMATION TRANSLATION SYSTEM

Filed April 14, 1958

INVENTOR.
EDWIN O. BLODGETT
BY John A. Harvey
ATTORNEY

United States Patent Office 3,037,075
Patented May 29, 1962

3,037,075

CODED INFORMATION TRANSLATION SYSTEM

Edwin O. Blodgett, Rochester, N.Y., assignor to Commercial Controls Corporation, Rochester, N.Y., a corporation of Delaware Filed Apr. 14, 1958, Ser. No. 728,348
13 Claims. (Cl. 178—23)

Figure 1A:
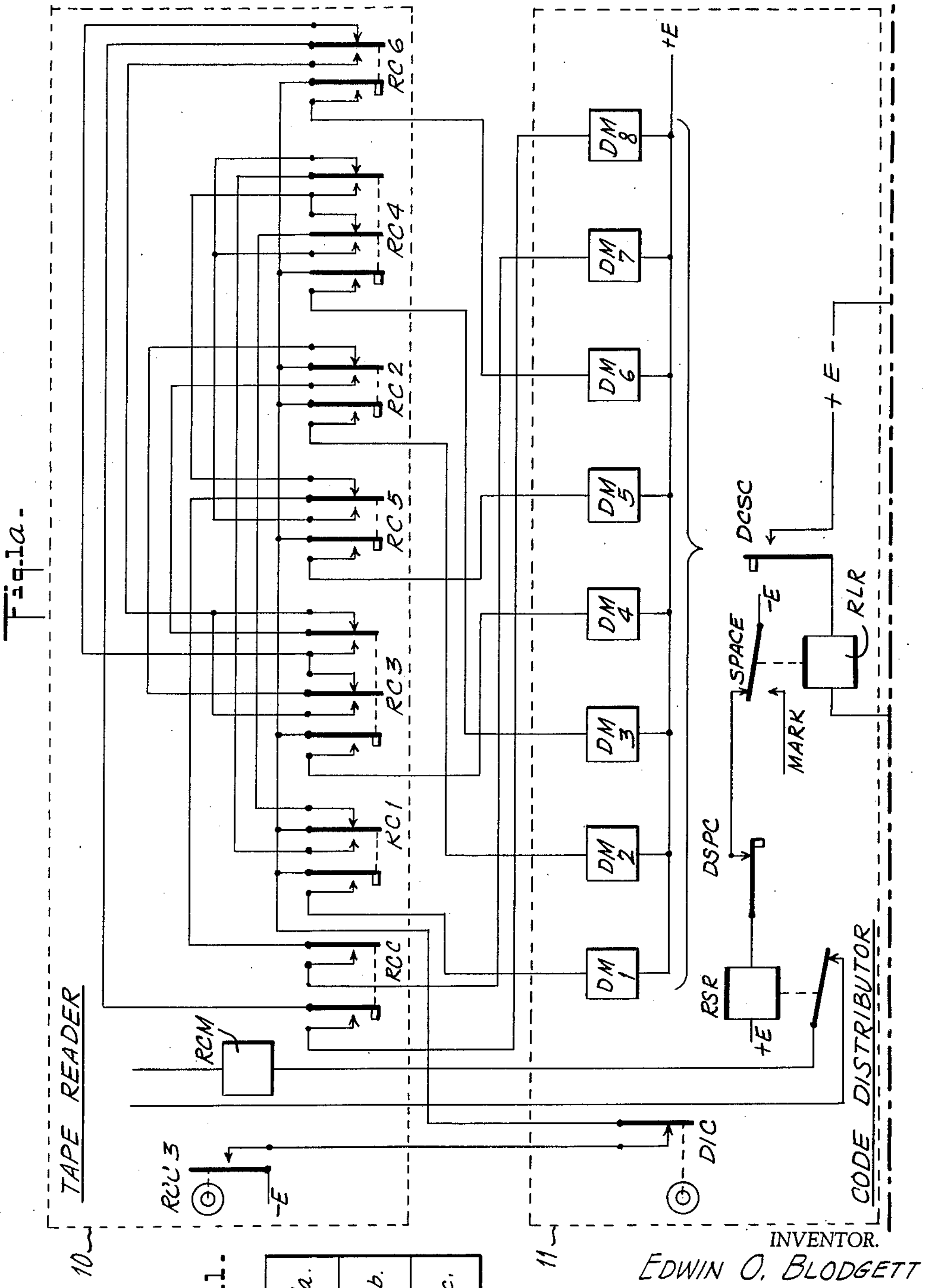

The present invention relates to coded information translating systems and equipments and, particularly, to such systems and equipments for transmitting information between two points one of which may be remotely situated from the other.

The copending application of Edwin O. Blodgett, Serial No. 608,110, filed September 5, 1956, now United States Patent No. 2,979,564, granted April 11, 1961, discloses a novel communication system in which information in coded form as punch recorded in tape is read by a tape reader and is subsequently transmitted by successive characters to a remote point and there rerecorded by punching a tape duplicating that at the transmitting locality. The Blodgett patent last mentioned points out that the tape reader and tape punch have unitary motorized constructions as shown in the Blodgett application Serial Number 546,902, which has now matured to United States Patent No. 2,927,158, granted March 1, 1960. Each information character is recorded and rerecorded by the use of code combinational groups of aligned punch holes in the tape. In transmitting each character, a code group is read and all of the code bits are supplied concurrently or in parallel to a code distributor. The latter transmits the code group as successive code bits to the distant receiver. At the receiver the successively transmitted code bits are collected as they are received, and when all have been collected they are supplied concurrently or in parallel to a tape punch which reproduces the code group by punch recording in a tape.

During the transmission and reception of each such information character, it is important that no code bit be lost or that no code bit be spuriously inserted since this changes the character transmitted to an entirely different and erroneous character as received. In the aforesaid copending application, provision is made to detect on an overall character basis the erroneous loss or insertion of a single code bit or of an odd number of code bits. The detection of an error immediately interrupts the continued operation of the system for purposes of correcting the error by retransmission of the information erroneously received. To these ends, each character code employed utilizes an odd number of code bits (commonly referred to as an odd parity code) so that the erroneous loss or insertion of a single code bit or of an odd number of code bits in a received character has the effect of converting the code of that character to one having an even number of code bits (even parity). It is this change of code parity which is detected in the arrangement of the copending application, and the parity error so detected is utilized in interrupting the system operation.

It has been found in practice that the transmission of information electrically over electrical communication channels often results in sporadic mutilation of two or three consecutive code bits, or even occasionally the mutilation of as many as four or more consecutive code bits, or the spurious injection (due to circuit "noise" or the like) of one or more spurious code bits. Mutilation of code bits may be the result of temporary or transient forms of short circuits or open circuits of the communication channel, and spurious injection of code bits may be caused by induced electrical impulses occasioned by atmospheric disturbances or the operation of adjacent electrical equipment. As previously explained, by using a known form of parity code the deletion or spurious insertion of a single code bit or odd number of code bits results in a character parity change which is readily detectable. It is evident, however, that the deletion or spurious insertion of an even number of code bits may not create a character parity change and therefore is not detectable even though the resultant character as received is an erroneous one.

It is an object of the present invention to provide a new and improved coded-information translating system and apparatus which effects with substantially improved reliability, by means of dual parity sensing, the detection and indication of any translation error resulting from overall system malfunctioning.

It is a further object of the invention to provide an improved coded-information translating system and apparatus which is characterized by continuous dual parity checking of such type as to sense and promptly indicate substantially all errors resulting from either loss or spurious injection of one or plural code bits even in those instances when the error should happen to preserve a preselected type of character code-form parity.

It is an additional object of the invention to provide a novel coded-information communication system and apparatus which enables a continuing double parity check to be effected without impairment of the information handling capacity of the communication channel employed.

It is yet a further object of the invention to provide a coded-information translating system and apparatus in which the translation of each group of code bits representative of an information character is accompanied by the translation of parity information applicable to the entire code-bit group and parity information applicable to at least one of two code-bit sub-groups thereof, thereby to enable high reliability of translation-error detection by concurrent overall and intermediate code-bit-group parity checking operations.

Figure 1:
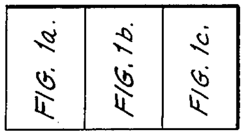
Figure 1B:
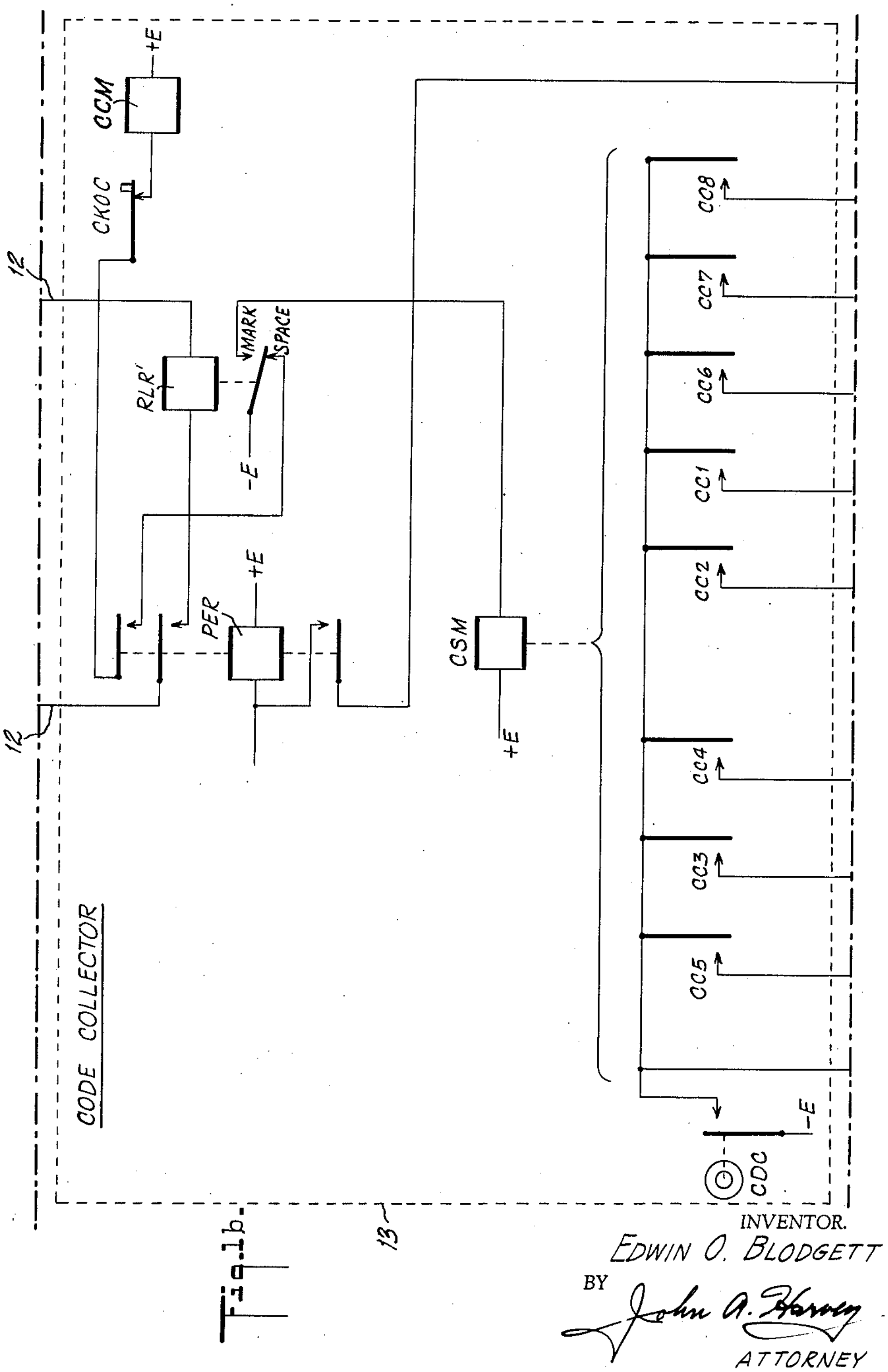
Figure 1C:
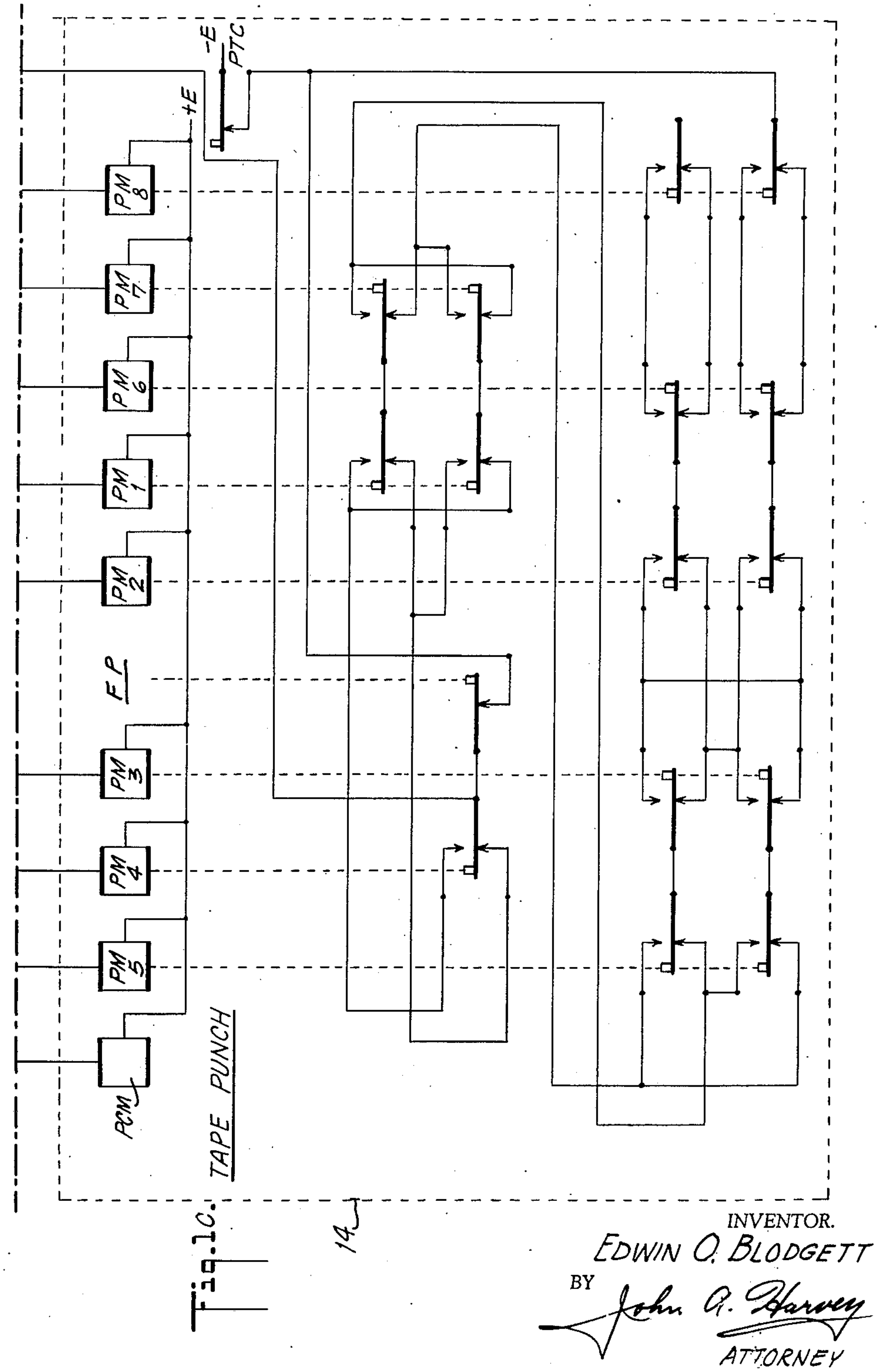
Figure 2:
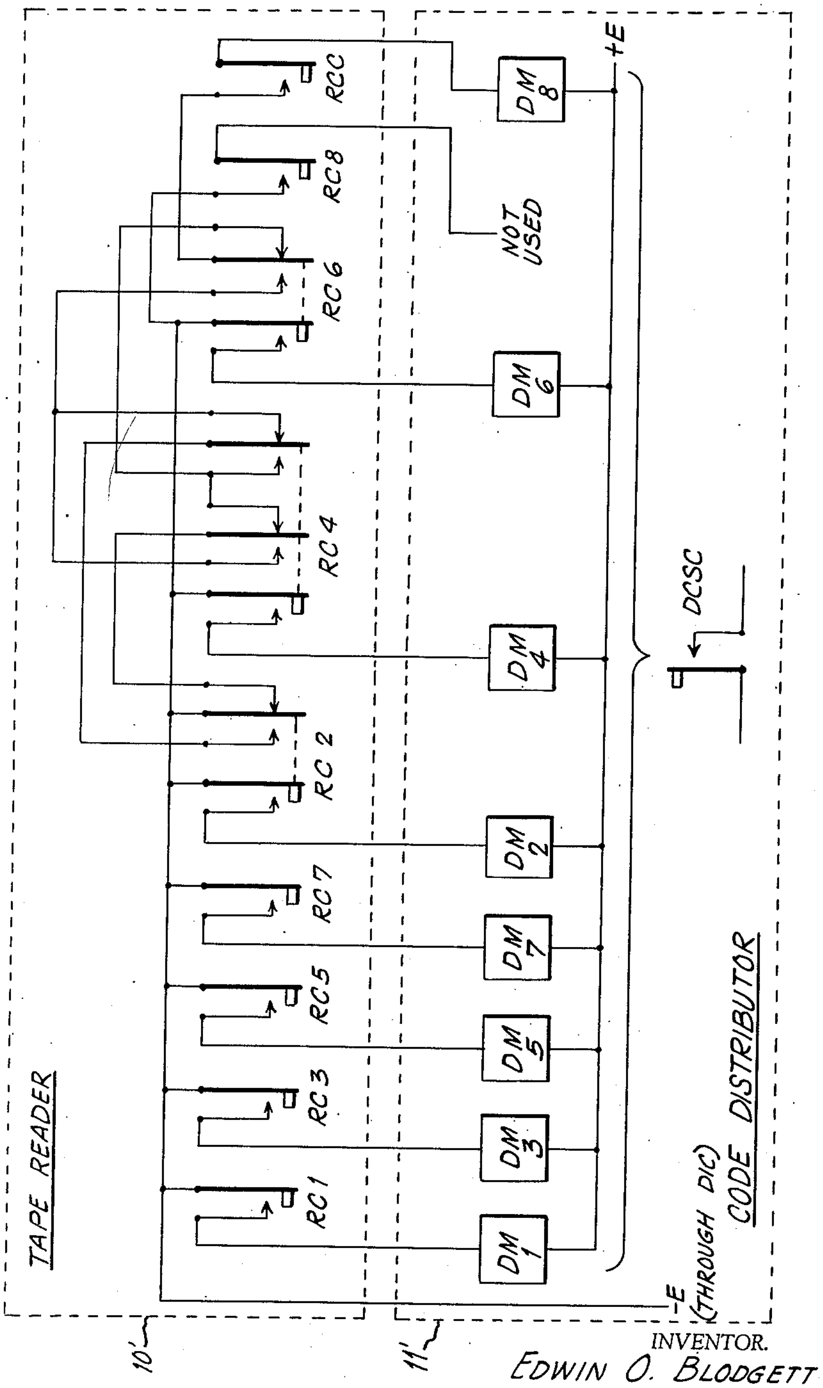
Figure 3:
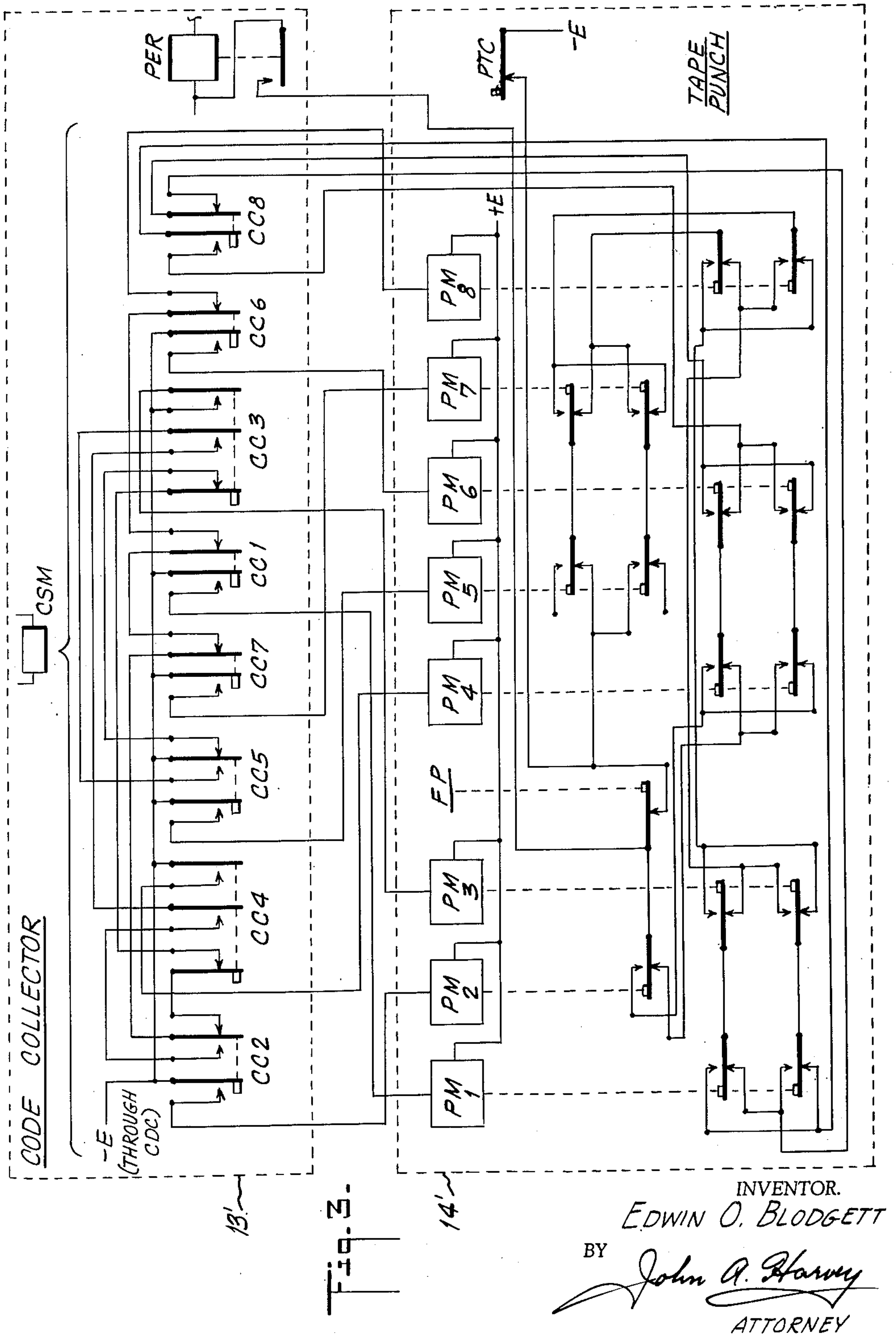

Other objects and advantages of the invention will appear as the detailed description proceeds in the light of the drawings forming a part of this application and in which:

FIGS. 1*a*–1*c* arranged as in FIG. 1 comprise a circuit diagram, partly schematic, of a complete coded-information translation system embodying the present invention in a particular form;

FIG. 2 shows the circuit arrangement of portions of a tape reader unit and code distributor unit suitable for transmitting coded information by use of a modified form of the invention; and FIG. 3 shows the electrical circuit arrangement of a portion of a code collector unit and a tape punch unit suitable for receiving information transmitted by the FIG. 2 units when utilizing the modified form of the invention.

While reference has been made in the foregoing to the translation of information "characters," it should be understood that in practice the information to be translated actually is comprised of alphabetic characters, numerals, symbols and printer-function control data. Each of these types of information is translated, however, as a unitary code-bit group and the term "unit of information" is accordingly used herein as generically definitive of these various types of information as recorded, rerecorded, and translated by individual code-bit groups.

Referring now more particularly to FIGS. 1*a*–1*c*, arranged as indicated in FIG. 1, there is represented a coded-information translating system which embodies one form of the invention and includes a tape reader unit 10 and code distributor unit 11 cooperating to transmit successive units of information through an electrical transmission line 12 to a code collector unit 13 cooperating with a tape punch unit 14. Except for the electrical circuit differences specifically here shown, the general construction and operation of the units 10, 11, 13 and 14 may be those disclosed and described in the aforementioned copending application. Accordingly, only the differences in arrangement and operation of these units will be herein considered as have relation to a translating system embodying the present invention.

The tape reader 10 includes a motor driven mechanical structure so arranged and operated that upon electrical energization of a reader clutch magnet RCM a plurality of reader pins are moved to read each of successive code-bit groups of apertures in the tape. The apertures of each group define by a six element or six level positional code individual ones of a large number of units of information. The reading pins have mechanically connected thereto, for actuation thereby, individual ones of a plurality of electrical contact assemblies RC1–RC6. Each contact assembly transfers its contacts whenever its associated reader pin extends through a code hole aperture in the tape being read. One pair of contacts of each assembly are energized in common through a cam-actuated contact DIC of the code distributor unit 11 and a cam-actuated contact RCC1 of the tape reader unit 10. The contacts DIC are closed during the first 59° of each cycle of operation of the unit 11, and the contact RCC3 is closed from 155° to 205° of each cycle of the reader unit 10 during which time the contact assemblies RC1–RC6 are actuated to their transfer positions by the reader pins. When so energized by concurrent closure of the cam-actuated contacts DIC and RCC1, the one pair of contacts of the reader contact assemblies energize an individual one of the distributor magnets DM1–DM6. The bits comprising each code-bit group read by the reader unit 10 are thus applied concurrently or in parallel to the distributor unit 11. The reader unit 10 includes an additional pair of reader common contacts RCC which close once each reader cycle at the time the reader contact assemblies RC1–RC6 have transferred, and these common contacts effect energization of the distributor magnets DM7 and DM8 of the code distributor unit 11 according to certain combinational transfers of the reader contact assemblies RC1–RC6 as will presently be explained more fully.

As more fully explained in the aforementioned copending application, the tape reader unit 10 and code distributor unit 11 operate in successive cycles of which the initiation of the cycle of each unit is intercontrolled by the cyclic operation of the other unit. In this, the tape reader unit reads the tape code holes representative of an information unit and halts in the reading position awaiting release by the code distributor unit 11. This release occurs when, in the cycle of operation of the latter, the code read by the tape reader unit has been received and temporarily stored in the unit 11. The tape reader unit 10 thereupon continues through another cycle and halts with its reader pins reading the code holes representative of the next succeeding character. As the reader does this, the last read code in energizing the code distributor magnets DM1–DM8 unlatches in the code distributor corresponding cam actuated levers which are permitted to cycle successively by motor driven cam actuation and in so cycling individually and successively to close a pair of code distributor selector contacts DCSC.

The code distributor selector contacts last mentioned are included in a closed electrical transmission circuit which includes a source of energization E, the energizing winding of a relay RLR, the conductors of a transmission line 12, a relay RLR′ included in the code collector unit 13, and normally open contacts of a parity error relay PER also included in the latter unit. At the completion of transmission of each code-bit group, the code distributor selector contacts DCSC are moved to their closed position and if the transmission circuit last described is electrically continuous the relay RLR of the code distributor unit 11 is energized and its transfer contacts are in the "mark" position. If, however, the transmission circuit should be electrically open at the completion of transmission of each code-bit group, the relay RLR stands deenergized to close its transfer contacts to their "space" position. At this time cam-actuated contacts DSPC of the code distributor unit 11 close, and a reader stop relay RSR is thereupon energized by virtue of the positioning of the transfer contacts of the relay RLR in their "space" position. Energization of the reader stop relay RSR interrupts the energizing circuit for the reader clutch magnet RCM and thereby terminates further operation of the tape reader unit 10. As will be pointed out more fully hereinafter, it is the function of the parity error relay PER of the code collector unit 13 to indicate a parity error in a received code-bit group or a code-bit sub-group or both. This indication of error is transmitted back to the code distributor unit 11 by the action of the relay PER contacts in interrupting the electrical continuity of the transmission circuit, whereby the operations of the tape reader unit 10 and distributor unit 11 are halted as last explained.

As described more fully in the aforementioned copending application, the relay RLR′ of the code collector unit 13 is energized each time that the code distributor selector contacts DCSC of the unit 11 close in transmitting a code bit of the code-bit group. Each such energization of the relay RLR′ effects transfer of its contacts to their "mark" position at which a code selector magnet CSM of the unit 13 is energized. The latter controls the selective release in sequence of a plurality of cam actuated levers, which in their released position effect closure of individual ones of a plurality of code collector contacts CC1–CC8. These are energized in common by a cam actuated contact CDC of the collector unit, the latter contacts closing just after the last possible code bit of a code-bit group is or should have been received. Thus in effect the operation of the code selector magnet CSM and associated cam actuated control levers is to collect and temporarily store, by controlled positioning of the code collector contacts CC1–CC8, each code-bit group received. Upon closure of the cam actuated contacts CDC of the unit 13, a punch clutch magnet PCM is energized to initiate a cycle of punch operation and the collected code bits temporarily stored by the code collector contacts CC1–CC8 are transferred in parallel to energize individual ones of a plurality of punch magnets PM1–PM8 provided in the punch unit 14 and thereby effect reproduction of a punched tape duplicating that read by the tape reader unit 10.

The operation of the code collector unit 13 is a cyclic one at a period corresponding to the transmission of successive code-bit groups. The operation of this unit is under control of the parity error relay PER which, as explained in the aforementioned copending application, is manually energized at the time the units 13 and 14 are placed in operation. Upon being so energized, the relay PER establishes a hold circuit for itself as shown through its hold contacts, a system of parity checking contacts which are provided in the unit 14 and are mechanically connected as indicated by the broken lines for actuation by the feed pin FP and individual ones of the punch pins under control of the punch magnets PM1–PM8, and punch tape contacts PTC of the tape punch unit 14 which are closed so long as a supply of tape remains in the tape unit in readiness to be punched. Each code-bit group transmitted by the unit 11 is preceded by the opening of the code distributor selector contacts DCSC of the unit 11 to deenergize the relay RLR′ of the code collector unit 13. This causes the transfer contacts of the latter relay to move to their "space" position and thereby, through contacts of the parity error relay PER in its energized state, energize a collector clutch magnet CCM through cam-actuated collector knock off contacts CKOC. This energization of the collector clutch magnet CCM initiates each cycle of operation of the code collector unit 13. Each cycle of the code collector unit 13 when thus initiated automatically effects initiation of a corresponding cycle of operation of the tape punch unit 14 through energization of the punch clutch magnet PCM of the latter as earlier explained.

In the operation of a communication system of the type just described, it has been found in practice as pointed out above that there is often sporadic mutilation of two or three or more consecutive code bits or the spurious injection of one or more code bits with resultant error in the received information unit. The present invention provides dual parity checking for such errors and does this in the presently described form of the invention not by an overall parity check made on a complete code-bit group as in the aforementioned copending application but rather by making a continuous parity check on each of two code-bit sub-groups included in each code-bit group. To this end, the first such code-bit sub-group is selected as the code bits Nos. 1, 4, 5 and 7 and the second sub-group as the code bits Nos. 2, 3, 6 and 8 with the code bit sequence of transmission in the code bit order of 1, 2, 4, 3, 5, 6, 7 and 8 so that successive bits are transmitted alternately from the two code-bit sub-groups. In these sub-groups, code bits Nos. 7 and 8 are redundant parity check bits used to maintain odd parity of their associated sub-group, and the remaining bits of the sub-group are information code bits. This results in an even type of parity for the code-bit group as a whole with odd parity for each code-bit sub-group.

To this end, the distributor magnet DM8 of the distributor unit 11 is energized through the reader common contacts RCC whenever there is no sub-group bit 2, 3 or 6 in an information unit code or whenever there are any two of these three possible code bits used in such code. As a result, there is always transmitted an odd number of code bits for this sub-group. In similar fashion, the distributor code magnet DM7 is energized through the reader common contacts RCC whenever there is no 1, 4 or 5 code bit employed in a given information unit code or when any two of these three possible code bits are employed in such code. Odd parity is accordingly maintained for this sub-group also, and the overall code-bit group has resultant even parity. Due to the transmission of code bits alternately from these two code-bit sub-groups, the loss or spurious insertion of a single code bit in either sub-group is readily detectable as is the loss or spurious insertion of two or more consecutive code bits which affect both sub-groups.

Whereas the transmission of all code bits alternately from the two code-bit sub-groups is effected at the reader 10 and distributor 11 by connecting the reader contact assembly RC3 to energize the distributor magnet DM4 and by causing the reader contact assembly RC4 to energize the distributor magnet DM3, in the code collector 13 and tape punch 14 the interchange of these two code bits is corrected to restore the original code format by energizing the tape punch magnet PM3 through the code collector contacts CC4 and by energizing the punch magnet PM4 through the collector contacts CC3. Since the code bits Nos. 7 and 8 are merely redundant parity code bits providing parity information for this first and second code-bit sub-group, and therefore form no part of the six code bits employed in representing an information unit, the punch pins associated with the tape punch magnets PM7 and PM8 are cut short so that they do not effect punching of the tape but rather only actuate their associated parity check contacts.

The parity check contacts included in the tape punch unit 14 are interconnected as shown to maintain electrical continuity (and thereby complete the hold circuit of the parity error relay PER) as long as the overall code-bit group parity is even and the parity of each code-bit sub-group is odd. Any failure of any of these parity check conditions to prevail causes an interruption of the hold circuit of the parity error relay PER, which thereupon drops out to terminate further operation of all of the units 10, 11, 13 and 14 as above described. Operation is resumed manually at the units 10 and 11 on the one hand and at units 13 and 14 on the other hand by a procedure explained in the aforementioned copending application.

A modified form of the invention is utilized in the tape reader 10' and code distributor 11' of FIG. 2 which are included with the code collector 13' and tape punch 14' of FIG. 3 in a complete communication system otherwise essentially similar to that represented in FIGS. 1*a*–1*c*. Due to the similarity of these two systems, FIGS. 2 and 3 show only such changes of structure and circuit arrangement as required to utilize the modified form of the invention.

Referring now more particularly to FIG. 2, the information unit code employed utilizes a maximum of eight code bits by which to represent individual units of information. Of these, either the No. 8 code bit may be used along to represent the carriage return function or the latter may be represented by a 2—3—4—5—8 code. The present form of the invention uses the fifth code bit as an overall code-bit-group redundant parity code bit, and divorces the eight code bit from its original function of representing the carriage return function and uses it instead as the redundant parity code bit of a sub-group of code bits comprised by the code bits Nos. 2, 4 and 6 which it will be noted inherently alternate with the code bits Nos. 1, 3, 5 and 7. Essentially then the code bit No. 5 maintains odd parity for the original code bit group as a whole while the code bit No. 8 maintains odd parity for translation of the code bit sub-group 2, 4 and 6, thus resulting in an overall translation code-bit group parity which may at any time be either odd or even. To maintain such odd parity of the code bit sub-group, the reader contact assemblies RC2, RC4 and RC6 are interconnected as shown to energize the distributor magnet DM8 (through the reader common contacts RCC which as previously noted close during the transferred condition of the reader contact assemblies RC1–RC8) whenever there is no 2, 4 or 6 code bit employed in a code-bit group or whenever any two of the three last named code bits are employed in a given code-bit group. Since this eighth code bit is now used for redundant parity information and is no longer available to function in transmitting the carriage return code bit No. 8 read by the reader 10' from the tape, the carriage return function unit of information may be transmitted simply as a blank code involving no code bits 1 through 7 or may be transmitted as a carriage return code utilizing only code bits Nos. 2, 3, 4 and 5. The operation of this modified form of the invnetion insofar as a tape reader 10' and code distributor 11' are concerned is otherwise essentially similar to that described above in connection with the corresponding units 10 and 11 of FIG. 1.

The code collector unit 13' of FIG. 3 receives the sequential code bit transmissions of the code distributor unit 11' of FIG. 2 and collects and temporarily stores the received code bits in the collector contact assemblies CC1–CC8. These contact assemblies effect energizations of individual ones of the punch magnets PM1–PM7 of the tape punch unit 14' to reproduce by punch coding of a tape a duplicate of the tape read by the tape reader. In accomplishing this, it is necessary that the punch magnet PM8 be energized to punch the original carriage return code and this is effected in either of two ways. In the first of these, the punch magnet PM8 is energized through normally closed contacts in all of the collector contact assemblies CC1–CC7 as shown whenever a blank code (No. 1–7 code bits) is transmitted and accordingly none of the latter mentioned contact assemblies transfer their contacts. In the alternative, the punch magnet PM8 is energized by the interconnections shown of the collector contact assemblies CC2, CC3, CC4 and CC5 whereby the receipt by the code collector of a 2—3—4—5 carriage return code also effects energization of the punch magnet PM8 to reproduce in the tape a 2—3—4—5—8 code. Either code corresponds to the carriage return code appearing in the tape read at the tape reader.

It was pointed out above that the overall code-bit group might have at any time either odd or even parity. Since the odd parity of the code bits Nos. 1 through 7 is maintained by the code bit No. 5 and the determination of a change of the overall group parity from odd to even is accomplished by the eighth code bit as it maintains odd parity of the code-bit sub-group comprised by bits Nos. 2, 4 and 6, the contact assembly CC8 of the code collector unit 13' controls the electrical interconnections of the parity contacts of the tape punch unit 14' to effect both odd and even parity checking. Thus, electrical continuity of the parity contact system is maintained for odd parity of the overall code-bit group so long as the code collector contact assembly CC8 does not transfer. Electrical continuity of the parity contact system is likewise maintained for even parity of the overall code-bit group if the code collector contact assembly CC8 transfers. It will accordingly be apparent that the present form of the invention likewise performs a dual parity check of the overall system operation, and in this instance there is a first parity check on the code-bit group as a whole and a second parity check on the code-bit sub-group comprised by the code bits 2, 4 and 6. Any parity error caused by loss or spurious insertion of a single code bit may affect either the overall group parity or the sub-group parity and is easily detectable, and any code bit loss or insertion involving two or more consecutive code bits affects both the group and sub-group parities and again is easily detectable. The operations of the code collector unit 13' and tape punch unit 14' are otherwise essentially similar to that described in connection with the units 13 and 14 of FIG. 1.

While a specific form of the invention has been described for purposes of illustration, it is contemplated that possible changes may be made without departing from the spirit of the invention.

I claim:

1. A coded information translation system comprising a plurality of electrical contact assemblies each operable individually between closed-contact and open-contact positions and each corresponding to an individual code bit of a multibit code group representative of an information item, means for concurrently actuating code-selectable ones of said contact assemblies to said closed-contact positions thereof in conformity with each of successive code-bit groups to be transmitted including with respect to each said group a redundant code-bit establishing a preselected type of parity for at least certain of said assemblies as a group thereof, preselected ones of said contact assemblies corresponding to a code-bit sub-group thereof having transfer contacts electrically interconnected between assemblies to generate a parity redundant code bit establishing a preselected type of parity for the total of all actuated code-bit sub-group assemblies, means controlled by said contact assemblies for transmitting sequentially the information and parity code bits of each code-bit group, means for receiving and utilizing successive transmitted code-bit groups, and means responsive to each utilized group of code bits for providing an error indication upon any departure of the utilized code-bit group from either of dual parity standards established by individual ones of said parity redundant bits.

2. A coded information translation system comprising a plurality of electrical contact assemblies each operable individually between closed-contact and open-contact positions and each corresponding to an individual code bit of a multi-bit code group representative of an information item, means for concurrently actuating code-selectable ones of said contact assemblies to said closed-contact positions thereof in conformity with each of successive code-bit groups to be transmitted, said contact assemblies having transfer contacts electrically interconnected between assemblies as arranged in two code-bit sub-groups thereof to generate for each said sub-group a parity redundant code bit establishing a preselected type of parity for the total of all actuated code-bit sub-group assemblies therein, means controlled by said contact assemblies for transmitting sequentially the information and parity code bits of each code-bit group, means for receiving and utilizing successive transmitted code-bit groups, and means responsive to each utilized group of code bits for providing an error indication upon any departure of the utilized code-bit group from either of dual parity standards established by individual ones of said parity redundant bits.

3. A coded information translation system comprising a plurality of electrical contact assemblies each operable individually between closed-contact and open-contact positions and each corresponding to an individual code bit of a multi-bit code group representative of an information item, cyclically operating means for concurrently actuating code-selectable ones of said contact assemblies to said closed-contact positions thereof in conformity with each of successive code-bit groups to be transmitted including with respect to each said group a redundant code-bit establishing a preselected type of parity for at least certain of said assemblies as a group thereof, preselected ones of said contact assemblies corresponding to a code-bit sub-group thereof having transfer contacts electrically interconnected between assemblies to generate a parity redundant code bit establishing a preselected type of parity for the total of all actuated code-bit sub-groug assemblies, cyclically operating means controlled by said contact assemblies for transmitting sequentially the information and parity code bits of each code-bit group, cyclically operating means for receiving and utilizing successive transmitted code-bit groups, and means responsive to each utilized group of code bits for halting the operation of each said cyclically operating means upon any departure of the utilized code-bit group from either of dual parity standards established by individual ones of said parity redundant bits.

4. A coded information translation system comprising a plurality of electrical contact assemblies each operable individually between closed-contact and open-contact positions and each corresponding to an individual code bit of a multi-bit code group representative of an information item, means for concurrently actuating code-selectable ones of said contact assemblies to said closed-contact positions thereof in conformity with each of successive code-bit groups to be transmitted, said contact assemblies having transfer contacts electrically interconnected between assemblies as arranged in two code-bit sub-groups thereof to generate for each said sub-group a parity redundant code bit establishing a preselected type of parity for the total of all actuated code-bit sub-group assemblies therein, means controlled by said contact assemblies for transmitting sequentially the information and parity code bits of each code-bit group by transmission of code bits selected alternatively from said contact assembly sub-groups, means for receiving and utilizing successive transmitted code-bit groups, and means responsive to each utilized group of code bits for providing an error indication upon any departure of the utilized code-bit group from either of dual parity standards established by individual ones of said parity redundant bits.

5. A coded information translation system comprising a plurality of electrical contact assemblies each operable individually between closed-contact and open-contact positions and each corresponding to an individual code bit of a multi-bit code group representative of an information item, means for concurrently actuating code-selectable ones of said contact assemblies to said closed-contact positions thereof in conformity with each of successive code-bit groups to be transmitted, said contact assemblies having transfer contacts electrically interconnected between assemblies as arranged in two code-bit sub-groups thereof to generate for each said sub-group a parity redundant code bit establishing odd parity for the total of all actuated code-bit sub-group assemblies therein, means controlled by said contact assemblies for transmitting sequentially the information and parity code bits of each code-bit group, means for receiving and utilizing successive transmitted code-bit groups, and means responsive to each utilized group of code bits for providing an error indication upon any departure of the utilized code-bit sub-group from odd parity as established by individual ones of said parity redundant bits.

6. A coded information translation system comprising a pluraltiy of electrical contact assemblies each operable individually between closed-contact and open-contact positions and each corresponding to an individual code bit of a multi-bit code group representative of an information item, means for concurrently actuating code-selectable ones of said contact assemblies to said closed-contact positions thereof in conformity with each of successive code-bit groups to be transmitted, said contact assemblies having transfer contacts electrically interconnected between assemblies as arranged in interleaving relation in two code-bit sub-groups thereof to generate for each said sub-group a parity redundant code bit establishing a preselected type of parity for the total of all actuated code-bit sub-group assemblies therein, means controlled by said contact assemblies for transmitting sequentially the information and parity code bits of each code-bit group by transmission of code bits selected alternately from said interleaved contact assembly subgroups, means for receiving and utilizing successive transmitted code-bit groups, and means responsive to each utilized group of code bits for providing an error indication upon any departure of the utilized code-bit group from either of dual parity standards established by individual ones of said parity redundant bits.

7. A coded information translation system comprising a plurality of electrical contact assemblies each operable individually between closed-contact and open-contact positions and each corresponding to an individual code bit of a multi-bit code group representative of an information item, a plurality of electromagnets, means for concurrently actuating code-selectable ones of said contact assemblies to said closed-contact positions thereof to energize individual ones of said electromagnets in conformity with each of successive code-bit groups to be transmitted, said contact assemblies having transfer contacts electrically interconnected between assemblies as arranged in two code-bit sub-groups thereof to energize for each said sub-group an individual one of said electromagnets in conformity with a preselected type of parity for the total of all actuated code-bit sub-group assemblies therein, means controlled by said electromagnets for transmitting sequentially the information and parity code bits of each code-bit group, means for receiving and utilizing successive transmitted code-bit groups, and means responsive to each utilized group of code bits for providing an error indication upon any departure of the utilized code-bit group from either of dual parity standards established by individual ones of said code-bit sub-groups.

8. A coded information translation system comprising a plurality of electrical contact assemblies each operable individually between closed-contact and open-contact positions and each corresponding to an individual code bit of a multi-bit code group representative of an information item and including a group parity redundancy code bit establishing a preselected type of group parity, means for concurrently actuating code-selectable ones of said contact assemblies to said closed-contact positions thereof in conformity with each of successive code-bit groups to be transmitted including said parity redundancy code bit, preselected ones of said contact assemblies corresponding to a code-bit sub-group thereof having transfer contacts electrically interconnected between assemblies to generate a parity redundancy code bit establishing a preselected type of parity for the total of all actuated code-bit sub-group assemblies, means controlled by said contact assemblies for transmitting sequentially the information and parity code bits of each code-bit group, means for receiving and utilizing successive transmitted code-bit groups, and means responsive to each utilized group of code bits for providing an error indication upon any departure of the utilized code-bit group from either of dual parity standards established by individual ones of said parity redundant bits.

9. A coded information translating system comprising means for reading a record medium having successive units of information each recorded in the form of a group of concurrently readable code bits including a parity redundant bit establishing a first group parity standard, means actuated by said reading means and responsive to a concurrently read code-bit sub-group constituted by a preselected pattern of plural code-bit positions in each said group to derive for said sub-group a parity redundant bit establishing a second sub-group parity standard, means controlled by each of said means for translating the code bits of each said group and the redundant bits applicable thereto sequentially by bits and with the sub-group bits alternating with other bits not included in the sub-group, and means responsive to each group of translated bits for providing an error indication in response to any departure thereof from either of said parity standards.

10. A coded information translator comprising means for reading a record medium having successive units of informaiton each recorded in the form of a group of concurrently readable code bits including a parity redundant bit establishing a first group parity standard, means actuated by said reading means and responsive to a concurrently read code-bit sub-group constituted by a preselected pattern of plural code-bit positions in each said group to derive for said sub-group a parity redundant bit establishing a second sub-group parity standard, and means controlled by each of said means for translating the code bits of each said group and the redundant bits applicable thereto sequentially by bits and with the sub-group bits alternating with other bits not included in the sub-group.

11. A coded information translation system comprising means for reading a record medium having successive units of information each recorded in the form of a group of concurrently readable code bits including a parity redundant bit establishing a first group odd-parity standard, means actuated by said reading means and responsive to a concurrently read code-bit sub-group constituted by a preselected pattern of plural code-bit positions in each said group to derive for said sub-group a parity redundant bit establishing a second sub-group odd-parity standard, means controlled by each of said means for translating the code bits of each said group and the redundant bits applicable thereto sequentially by bits and with the sub-group bits alternating with other bits not included in the sub-group, and means responsive to each group of translated bits for sensing an odd-parity standard in the absence of said sub-group parity bit and an even-parity standard in the presence of said sub-group parity bit for providing an error indication in response to any departure thereof from either of said parity standards.

12. A coded information translation system comprising means for reading a record medium having successive units of information each recorded in the form of a group of concurrently readable code bits including a parity redundant bit establishing a first group parity standard, means actuated by said reading means and responsive to a concurrently read code-bit sub-group constituted by a preselected pattern of plural code-bit positions in each said group to derive for said sub-group a parity redundant bit establishing a second sub-group parity standard, means controlled by each of said means for translating the code bits of each said group and the redundant bits applicable thereto sequentially by bits and with the sub-group bits alternating with other bits not included in the sub-group, means for receiving and collectively utilizing successive groups of translated code bits, and means controlled by said receiving means for sensing one of said parity standards in the absence of said sub-group parity bit and the other of said parity standards in the presence of said sub-group parity bit and for providing an error indication in response to any departure of the utilized code-bit group from either of said parity standards.

13. A coded information translation system comprising means for reading a record medium utilizing a preselected maximum number of code channels to derive by concurrent reading of all said channels successive code-bit groups representative of successive units of information and including a parity redundant bit establishing a first code-bit group parity standard, said reading means in reading said medium being non-responsive to a preselected one of said code channels, means actuated by said reading means and responsive to a concurrently read code-bit sub-group constituted by a preselected pattern of plural code-bit positions in each said group to derive for said sub-group a parity redundant bit establishing a second sub-group parity standard, means responsive to each said derived code-bit group including said parity bits for translating the bits thereof sequentially with the sub-group bits alternating with other bits not included in the sub-group and with the sub-group parity bit translated by utilizing the addiitonal information channel made available to said translating means by virtue of the non-response of said reading means to said one code channel, and means responsive to each group of translated bits for providing an error indication in response to any departure thereof from either of said parity standards.

References Cited in the file of this patent

UNITED STATES PATENTS

| | | |
|---|---|---|
| 2,596,199 | Bennett | May 13, 1952 |
| 2,653,996 | Wright | Sept. 29, 1953 |
| 2,689,950 | Bayliss et al. | Sept. 21, 1954 |

UNITED STATES PATENT OFFICE

CERTIFICATE OF CORRECTION

Patent No. 3,037,075 May 29, 1962

Edwin O. Blodgett

It is hereby certified that error appears in the above numbered patent requiring correction and that the said Letters Patent should read as corrected below.

Column 8, line 30, for "sub-groug" read -- sub-group --; line 57, for "alternatively" read -- alternately --.

Signed and sealed this 2nd day of October 1962.

SEAL)
Attest:

ERNEST W. SWIDER
Attesting Officer

DAVID L. LADD
Commissioner of Patents